Nov. 4, 1969  C. J. SLIVINSKY ET AL  3,476,625
METHOD OF FORMING A COMPOSITE SPAR ABOUT A METAL TUBE
Filed May 3, 1966
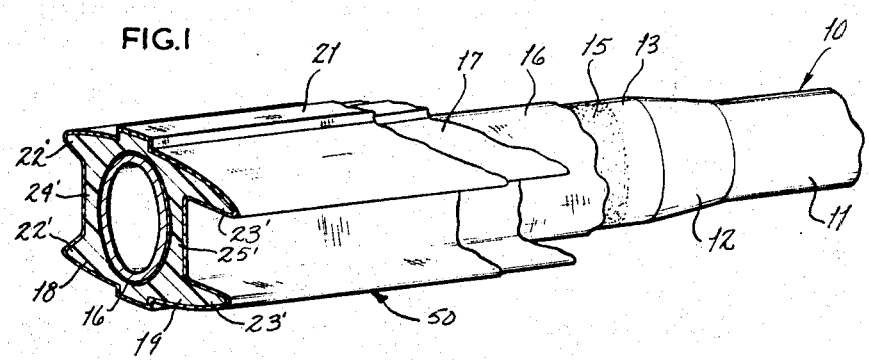
FIG. 1
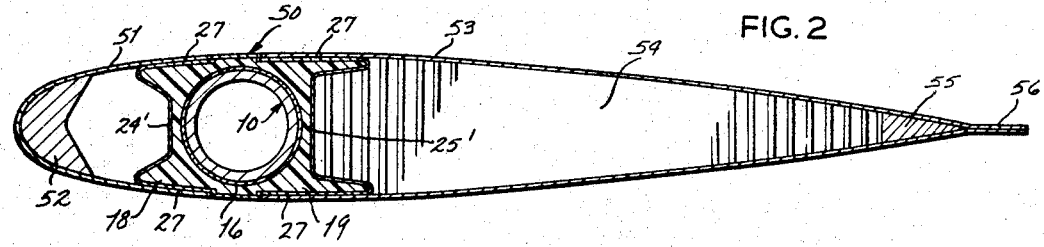
FIG. 2
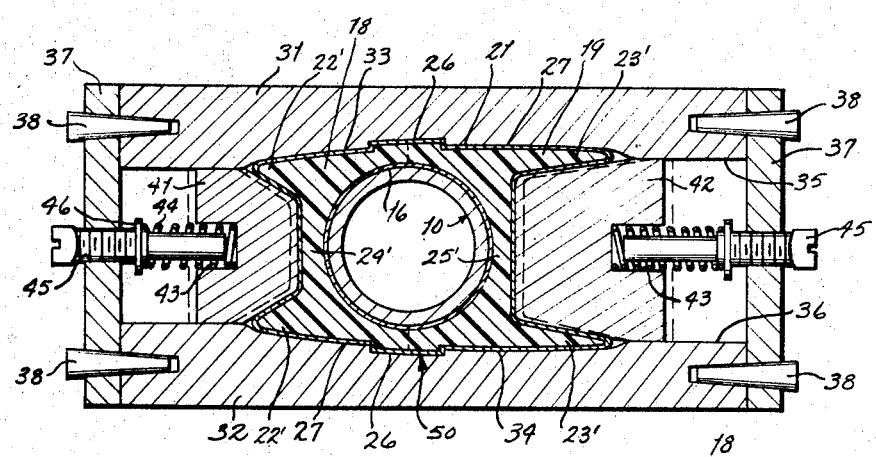
FIG. 4
FIG. 3
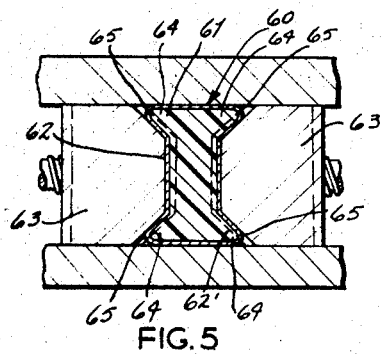
FIG. 5
INVENTORS
CORNELL J. SLIVINSKY
STANLEY STEED
BY
*Jerome J. Gross*
ATTORNEY United States Patent Office 3,476,625
Patented Nov. 4, 1969

3,476,625
METHOD OF FORMING A COMPOSITE SPAR ABOUT A METAL TUBE
Cornell J. Slivinsky and Stanley Steed, Traverse City, Mich., assignors to Parsons Corporation, Traverse City, Mich., a corporation of Michigan
Filed May 3, 1966, Ser. No. 547,221
Int. Cl. B29c 27/28; B32b 1/10
U.S. Cl. 156—86          4 Claims

ABSTRACT OF THE DISCLOSURE

A method of forming helicopter rotor blade spars by molding about a metal spar tube, fiber and plastic resin filler material with glass cloth wrappings. Shrinkage of the plastic filler material attendant to curing is compensated by pressing the outer wrapping sideward and inward, to form indentations which leave skin support flanges above and below. By continuing the pressure as curing progresses, the indentations deepen, holding the outer wrapping tight and maintaining its original peripheral length.

---

The present invention relates to a method of making spar beams for helicopter rotor blades and the like, and in particular to composite spars in which a metal tube is encased in plastic material, to support forward and aft airfoil structures and serve as the principal structural member of the rotor blade.

Many problems have been encountered in attempting to create a unitary composite structure instead of a mere plastic casing in a spar tube. In addition to the problem of adhesion is the problem of forming the plastic material so reliably and with such predictable strength and rigidity as to serve with the steel tube as a composite beam. Yet it must be molded with such precision as to support the forward and aft skins and supplemental structures and set the contour necessary therefor.

Unidirectional glass fiber rovings, arranged spanwise, have substantial structure strength in bending; and may be so proportioned as to establish a desired cross-section. However, when molded with a molding resin, a substantial amount of bulk shrinkage occurs during curing. If such rovings be tightly wrapped with a glass cloth wrapping, prior to curing, the shrinkage in bulk will leave the wrapping too long. Pressure accompanying curing will compress the glass cloth wrapping and its fibers are likely to be damaged thereby. Thus the glass cloth wrapping will lose its ability to contribute to the structural strength of the spar or beam in which used.

The purposes of the present invention are to oevrcome these prior art difficulties and to provide a method of molding a spar or beam of ideal shape and reliable structural qualities, in which the shrinkage of the resin plastic filler material is compensated by taking up the perimetral length of the fiber glass cloth wrapping. Another purpose is to provide a method of making upon a basic steel spar tube of circular cross-section, a composite beam, flanged in the manner of an I-beam and contoured above and below to aid in establishing the airfoil shape. Additional purposes will be apparent from the remainder of this specification.

Generally summarized, the present invention is carried out by adhering to the steel spar tube a tight wrapping of structural cloth such as fiber glass cloth; then providing a preliminary filler cross-section, whose perimeter is substantially the same length as that ultimately desired, by pressure-forming uncured, resin-impregnated glass fiber rovings placed thereabout; then tightly wrapping this preliminary cross-section with the structural glass fiber cloth; and then, while molding the top and bottom of the wrapped assembly to fixed dimensions and contours, simultaneously pressing taperingly inward on the forward and aft sides of the wrapped assembly and continuing so to urge them taperingly inward while the plastic material is cured. The tapering indentations deepen as the bulk shrinks on curing, but the perimeter length of the cross-section remains substantially the same, thus preserving the strength of the glass fiber cloth wrapping material.

In the accompanying drawings:

FIG. 1 is a perspective view, partly broken away, of a composite spar made according to the method of the present invention.

FIG. 2 is a cross-sectional view of a typical helicopter rotor blade structure showing a spar constructed according to the method of the present invention.

FIG. 3 is a perspective view, partly broken away, of roving filler material in preliminarily formed portions.

FIG. 4 is a cross-sectional view of the composite spar in final molded contour, shown in place within a schematically simplified molding fixture. The dashed lines indicate the positions of the molding rams prior to curing.

FIG. 5 is a schematic view illustrating the present method as applied to a simpler type of spar beam.

Referring now to the accompanying drawings, FIG. 1 shows a composite spar molded in accordance with the present method, broken away to illustrate certain stages of the work. Illustrated is a steel spar tube generally designated 10 which may include an outer tube portion 11 of relatively small outside diameter, a step-taper portion 12, and a larger outer diameter root portion 13. The tube 10 is coated over its entire length with a coating of suitable plastic-to-metal bonding adhesive 15, which may be a vinyl epoxy adhesive, for example. Over the adhesive layer 15 are tightly wrapped one or two layers of resin-impregnated structural cloth 16, preferably unidirectional glass fiber cloth; and they are bonded to the tube 10 under such pressure and heat as are suited for the adhesive 15.

High-strength plastic filler material, typically fiber glass rovings 17 preimpregnated with a molding resin and still somewhat viscous to touch, are arranged longitudinally spanwise and then preliminarily shaped under low pressure to a cross-section whose perimeter is the same length as that of the ultimately desired spar cross-section. FIG. 3 shows a convenient way of achieving this purpose. A forward preliminarily-shaped roving part 18 and an aft roving part 19 are pressed in simple molds to the approximate shape desired. The glass fiber rovings utilized may consist each of a substantially large number, say approximately 60, threads spun of glass fiber aligned spanwise and impregnated with suitable quantity of molding resin. When the parts 18, 19 are assembled against the forward and aft sides of the spar tube 10 they present a cross-section whose perimeter is substantially the same length as that of the ultimately desired cross-section shown in FIGS. 2 and 4. The pressure shaping does not cure the rovings 17; their plastic resin remains viscous and when assembled for final curing the two parts 18, 19 become integral.

After the assembly of the pressure-shaped parts 18, 19 onto the cloth wrap 16 on the tube 10 the next step is to wrap this assembly with one or more layers of structural cloth, preferably the same unidirectional preimpregnated glass fiber cloth utilized for the tube wrapping 16. Such outer structural cloth wrapping 21 does not change the shape of the parts 18, 19; see FIG. 3 and the dashed lines of FIG. 4. The forward flanges 22 and aft flanges 23 of the preliminarily-shaped parts 18 and 19 commence their taper at a substantial distance from the upper and lower surfaces of the pressure-shaped parts 18 and 19. Likewise the vertical web portions 24, 25 are somewhat thick. In contrast, when the composite spar is finally molded, the forward and aft web portions finally molded designated 24', 25' are relatively thinner; and the taper of the forward and aft flanged portions as finally molded designated 22', 23' is at the same angle but closer to the upper and lower surfaces. As will be demonstrated, the peripheral length of the outer cloth wrapping 21 remains the same.

The change in thickness as described results from the loss of volume of the resin in the plastic resin on being finally cured under pressure. Such loss may be 10 percent, more or less. For applying continuing pressure and yet without reducing the perimeter, the present molding and curing process has been devised. Actual molds are fairly complex, utilizing controlled pneumatic pressure and localized heat-application means. To illustrate the present process, however, a simplified mold is schematically shown in FIG. 4. Its top portion 31 and bottom portion 32 have contour mold faces 33, 34 respectively which are of fixed dimension and contour. They provide the spar as molded with central upper and lower surface portions 26 at the airfoil contour and recessed portions 27 forward and aft thereof to receive and accommodate airfoil skins. Continuing forward and aft of the spar, the upper and lower fixture parts 31, 32 have parallel horizontal inner surfaces 35, 36. The top and bottom mold parts 31, 32 are secured to each other during molding by any suitable means. In the simplified embodiment shown, taper pins 38 in heavy forward and aft plates 37 draw the top portion 31 to the bottom portion 32 to establish fixed outer vertical dimensions.

Between the parallel horizontal surfaces 35, 36, forward and aft molding rams 41, 42 are provided, having parallel upper and lower sliding surfaces and a tapered ram surface. They exert pressure taperingly inward against the forward and aft sides of the wrapped assembly during molding. Any convenient method of pressing them continuingly inward may be used. While pneumatic pressure, which is readily controlled, would probably be used in production tooling, the simplified molding rams 41, 42 illustrated have slots 43 in their outer sides, against which compression springs 44 bear, the springs being centered on screw pins 45 and pressed inward by flanges 46 thereon. The molding fixture of FIG. 4 is thus merely schematic of many known ways by which the forward and aft sides of the outer cloth wrapping 21 may be simultaneously pressed taperingly inward and the pressure continued during the curing operation. Likewise, FIG. 4 does not show a source of heat, such as is used in the curing of plastic resins.

Pressure molding and heat-curing are carried on simultaneously, as is conventional. The molding rams 41 move inward from the positions shown in dashed lines in FIG. 4 to the solid line positions there shown, the differences in position being exaggerated for illustrative purpose. The molding operation makes the preliminarily-shaped filler parts 18, 19 integral with each other and substantially unitary with the inner and outer wrappings of fiber glass cloth 16, 21. As the resin shrinks on curing, the pressure exerted draws the outer cloth wrapping 21 tightly taperingly inward. The tapered upper and lower edges of the rams 41, 42 thin the upper and lower forward and aft flange portions 22, 23 to their final size as designated 22', 23' in FIG. 4; while the flat front edge ram surfaces thin the web portions 24, 25 to their final thickness 24', 25'. As will be obvious from the drawings, the perimeter of the outer wrapping 21 is not substantially changed; thus tension attendant to wrapping is not relaxed by shrinkage on curing; and no wrinkles or compression stresses are set upon in the glass fibers of the wrapping 21. After curing, the mold is opened and the completed spar henceforth designated 50 is ready for assembly.

Referring to FIG. 2, the composite spar 50 may be utilized as follows: a formed leading edge plate 51 having a leading edge ballast bar 52 adhered therein, is adhered by its lengthwise edges within the upper and lower forward recesses 27. The forward edges of aft skins 53 are similarly adhered within the aft recesses 27; honeycomb filler 54, contoured to the shape of the aft portion of the airfoil, is bonded between the skins and the aft flanges 23; a trailing edge strip of triangular cross-section 55 is inserted between them immediately forward of their trailing edge juncture 56, which is likewise adhered. The order of these operations is immaterial.

The method of the present invention is perhaps more clearly illustrated in connection with a simpler embodiment, FIG. 5, of the principle of maintaining constant perimeter during the shrinkage attendant to curing. Shown in cross-section is an I-beam configuration spar generally designated 60 formed of resin-impregnated rovings 61 aligned spanwise and preliminarily pressed to approximately the broader shape shown in solid lines in FIG. 5 and then tightly wrapped with resin-impregnated fiber glass cloth 62. Forward and aft molding rams 63 having tapered upper and lower edges are then employed between upper and lower mold halves, similar to the mold halves 31, 32, to exert pressure while the wrapped I-beam spar 60 is cured. The shrinkage on curing results in a slenderer beam, drawing the cloth wrapping 62 inward and tapering the contour of the beam flange portions as indicated by the line designated 62'. The tapering surfaces of the molding rams 63 have indented themselves more deeply into the wrapping 62 and draw the cloth 62 to corners 64 which are more sharply defined than thet original rounded edges 65. However, the shrinkage (whether it be 10 percent or more depending on the constituency of the molding resin and its bulk loss of curing) does not substantially affect the perimeter length of the cloth wrapping 62, 62'; its fibers are not crimped or wrinkled.

Spar shapes may be molded by the present process to serve as a foundation by which airfoil shape is established as well as providing strength, rigidity and light weight. Particularly desirable in these respects is the composite spar shown in FIGS. 1–4, which includes the torsional rigidity and other structural advantages of the steel tube and yet, instead of presenting a circular cross-section, in effect serves to shape the airfoil and provides attachment flanges 22', 23' to which the forward and aft skins 51, 53 may be readily adhered, even using room-temperature adhesives and only enough pressure to hold the skins 51, 53 in contact therewith.

The present process thus is adapted to producing a variety of beam spar shapes, with modifications in detail such as will be apparent to those skilled in the art.

We claim:

1. The method of making an I-beam spar of plastic-impregnated structural cloth covering a plastic filler material of a type which shrinks on curing comprising the steps of preliminarily pressure-forming the filler material to a cross section whose perimeter is substantially the same length as that of the ultimately desired spar cross-section, then tightly wrapping the preliminarily formed filler material around said perimeter with a plastic-impregnated structural cloth, and then molding the top and bottom portions to fixed dimension and contour and simultaneously pressing taperingly inward indentations on the forward and aft sides of the said wrapping and continuing said pressure while curing the plastic material, whereby, as such indentations are pressed inward, the perimeter length of the cross-section so formed remains substantially the same regardless of the extent of shrinkage of the plastic filler material, and the wrapping thereon remains tight.

2. The method of making an I-beam spar as defined in claim 1, in which the structural cloth is woven of glass fibers and is plastic-impregnated, and in which the plastic filler material includes resin and glass fiber rovings together with the step of aligning said glass fiber rovings spanwise prior to the step of preliminarily pressure-forming said filler material.

3. The method of forming a composite spar about a metal tube, comprising the steps of adhering an inner wrapping of structural cloth to said tube with a metal-to-cloth adhesive, then arranging filler material, including uncured plastic material, to a preliminary shape to encompass said wrapped tube, and pressing until the perimeter of said preliminary shape is substantially the same as that of the ultimately desired spar cross-section, then wrapping about the perimeter of such preliminarily formed filler material, in place on the wrapped tube, an outer wrapping of structural cloth, and then molding the portions above and below the tube to fixed dimension and contour and simultaneously pressing said outer wrapping sideward and taperingly inward toward the tube, and while continuing said molding and inward pressure, curing the plastic material, whereby to compensate for loss of volume attendant to curing and yet to maintain the peripheral length of the outer wrapping.

4. The method of making a composite spar about a metal tube as defined in claim 3, wherein the step of molding the top and bottom portions includes conforming parts of them to airfoil contour and recessing forward and aft-adjacent parts therefrom, and wherein the step of pressing sideward and taperingly inward includes forming the parts thereabove and therebelow into skin-support flanges.

References Cited

UNITED STATES PATENTS

| | | |
|---|---|---|
| 3,028,292 | 4/1962 | Hinds. |
| 3,021,246 | 2/1962 | Hutter et al. _____ 156—196 |
| 2,852,840 | 9/1958 | Harvey _____ 156—194 |
| 2,202,014 | 5/1940 | Lougheed _____ 156—194 XR |

HAROLD ANSHER, Primary Examiner

PHILIP DIER, Assistant Examiner

U.S. Cl. X.R.

156—214, 581; 170—159; 264—137, 248, 250